Feb. 7, 1933.  R. R. DOWNIE  1,896,293
EXCAVATING MACHINE
Filed Nov. 14, 1929  2 Sheets-Sheet 1

INVENTOR
R. R. Downie
BY
Philip E. Liggus
ATTORNEY

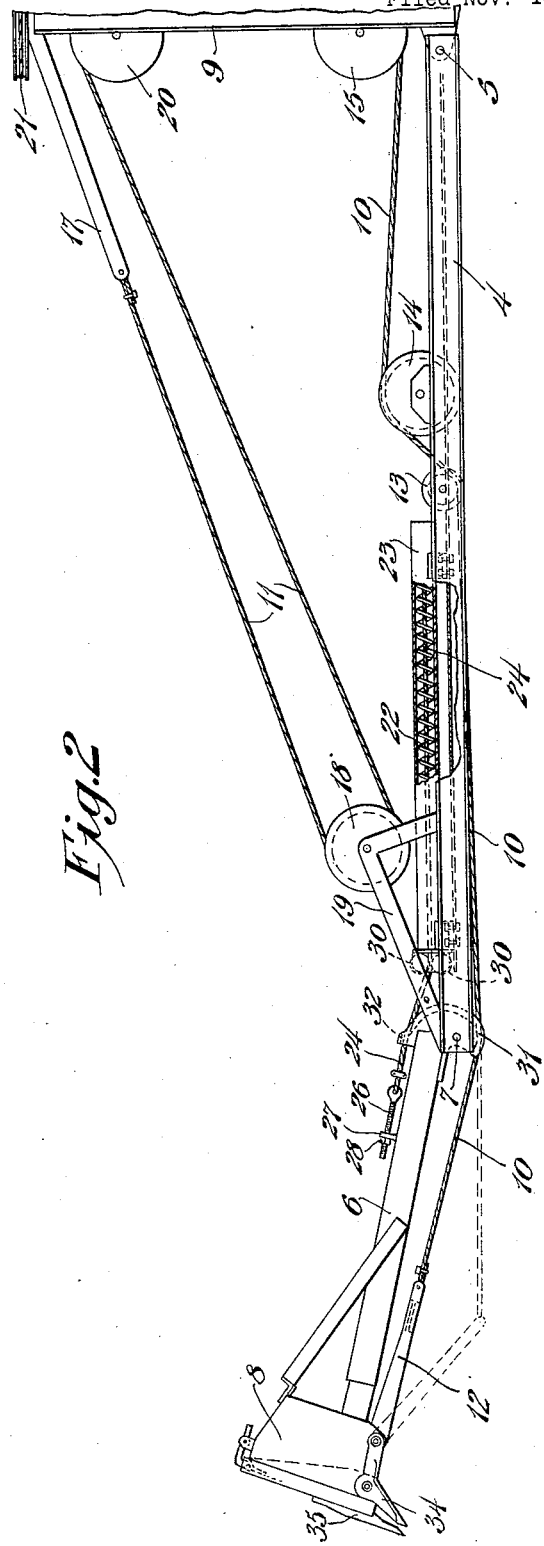

Patented Feb. 7, 1933

1,896,293

UNITED STATES PATENT OFFICE

ROBERT REX DOWNIE, OF BEAVER FALLS, PENNSYLVANIA

EXCAVATING MACHINE

Application filed November 14, 1929. Serial No. 407,409.

This invention relates to pull stroke ditchers of the type disclosed in my Patent No. 1,511,114. Among other objects, the invention aims to provide a pull stroke ditcher whose scoop may be controlled by a single power line, namely, the hauling line, in conjunction with scoop-retractive mechanism which operates independently of the boom. A specific object is the provision of means for retracting a ditcher stick, that is, moving it in the non-digging direction, through 180° without co-action of the hoisting line with the hauling line, and without movement of the boom.

In the accompanying drawings showing an embodiment of the invention,—

Fig. 2 is a similar view, showing the ditcher stick retracted and in position to start an excavation.

Figure 1:
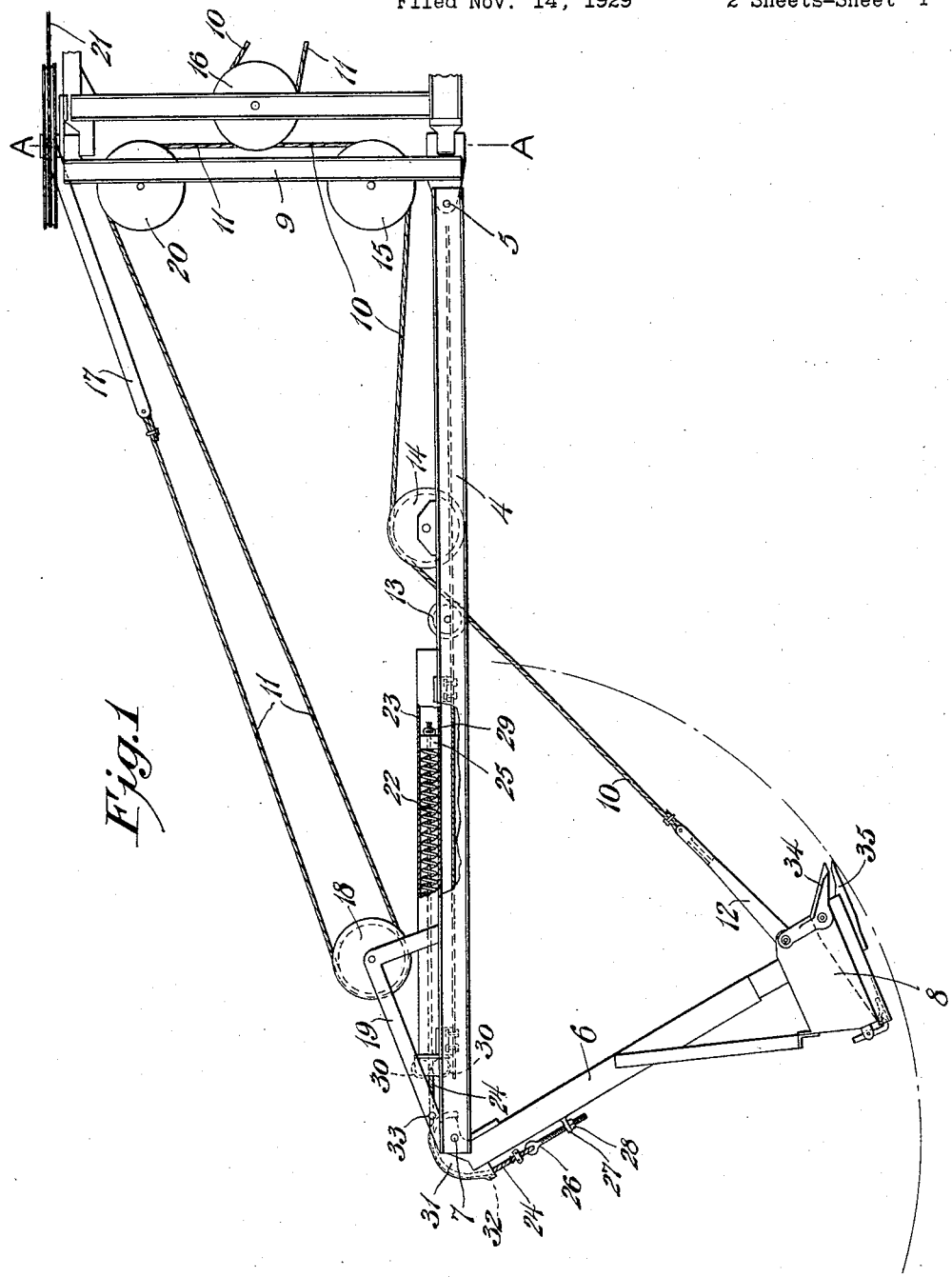
Fig. 1 is an elevation of the boom, stick and scoop assembly of a ditcher.

Referring particularly to the drawings, there is shown a boom 4 pivoted to swing vertically about a horizontal axis 5, a ditcher stick 6 pivotally connected, as at 7, to the outer end of the boom, a scoop 8 fast to the ditcher stick, a mast 9 rotatable about the axis of line A—A (Fig. 1), a hauling line 10 and a hoisting line 11.

The scoop 8 is preferably of the construction disclosed in my Patent No. 1,716,432 and preferably is secured to the ditcher stick in the manner disclosed in my Patent No. 1,709,466. The pivoted bottom of the scoop may be released by a motor-operated latch mechanism (not shown), as disclosed in my application Serial No. 244,291 filed January 3, 1928, or by a hand operated latch line, as in Patent 1,511,114, or the latch may be controlled by the hauling line, as disclosed in my pending application Serial No. 292,655, for example.

The hauling line 10 is preferably secured to the scoop by means of a bail 12, and is guided by sheaves 13, 14, 15, 16, as shown in Patent No. 1,511,114, to a power-driven drum (not shown). The hoisting line 11 is preferably dead-ended to a bridle 17 at the top of the mast 9, as shown, and passes around a sheave 18 which is rigidly secured to the boom 4 near its outer end, by means of a sheave stand 19. Thus sheave 18 may be used, without change, when the same boom is employed with a skimmer scoop, as will be understood by referring to my Patent No. 1,536,390 for a skimmer scoop. The hoisting line passes around a guide sheave 20 and around another sheave back of sheave 16, to another power drum (not shown). The mast 9 is oscillated on its longitudinal axis by means of a power-actuated line 21 (Fig. 1), thus swinging the scoop laterally as for discharging.

The machine as so far described would be a very inefficient excavator because there would be no way to get the ditcher stick out beyond the vertical or plumb position, hence the "sweep" or arcuate movement of the scoop in actual excavation would be restricted to about 90° to 100°, and no downward blows could be delivered to dislodge and break up hard material. To get the ditcher stick out beyond the plumb position without employing a connection between the hoisting line and the upper end of the ditcher stick, a motor in the form of a powerful spring or set of springs is connected to the ditcher stick so as to tend at all times to pull the stick to the horizontal position of Fig. 2. The spring or springs act automatically, and hence there is no need for a third power line or other operator-controlled power member; and the two line control of the machine of Patent No. 1,511,114, which is so valuable a feature of that machine, is preserved.

In the specific embodiment, a compression spring 22 in a cylindrical casing 23 acts on a cable 24 by means of a plunger or piston 25 reciprocable in the casing, cable 24 being secured to the ditcher stick 6 so that as the spring 22 expands, the ditcher stick is thrown out or swung backwardly to the position of Fig. 2. Cable 24 is secured to the ditcher stick by means of an eye-bolt 26 which engages a bracket 27 fixed on the ditcher stick, and adjusted lengthwise by a nut 28. The other end of cable 24 is secured by a cable clamp 29 to piston 25. Cable 24 is guided between two guide sheaves 30 at the end of casing 23, and passes around a grooved head 31 on the upper or pivoted end of the ditcher stick, the groove in head 31 receiving and guiding the cable. At the outer, lower extremity of head 31, there may be an aperture 32 through which cable 24 passes.

As the spring 22 should throw the ditcher stick and scoop out to a substantially horizontal position (Fig. 2), and as the resistance to such movement increases with the height of the scoop (because the moment arm of the scoop lengthens as it moves from the plumb position to the horizontal position), it is desirable to provide some means for increasing the leverage or moment arm with which cable 24 pulls the ditcher stick out beyond the plumb position. This result is effected by making grooved head 31 eccentric relative to the ditcher stick pivot 7, as shown in the drawings. This eccentric mounting of the ditcher stick head 31 results in an increase in the radius of the groove extending over the head toward the outer, lower extremity, providing a progressive increase in the moment arm upon which the force of the spring is exerted, as the scoop is swung outwardly and upwardly. Compare Figs. 1 and 2. Thus any decrease in the force of the spring as its compression is relieved is largely compensated.

The adjustment eye-bolt 26 is of sufficient length to permit starting of nut 28, with the stick extended and resting upon the ground, and also to permit drawing up the spring from free length to an initial working pressure suitable for the weight of the scoop and the nature of the work. Various sizes and capacities of scoops are used with a single ditcher stick (see Patent No. 1,709,466); hence a considerable range of adjustment of the spring pressure is desirable.

As heretofore stated, a ditcher scoop and skimmer scoop are used interchangeably upon the same boom, with the same hoisting and hauling cables, and hence provision for interchange of scoop without disconnecting the hoisting line 11 is advantageous, since it makes possible use of the machine as a crane for placing the scoop and the parts with which it is assembled. The sheave stand 19 is permanently secured, as by riveting or welding, to the boom, serving alike in connection with the ditcher and the skimmer (the latter being illustrated in Patent No. 1,536,390). For use of the skimmer a sheave, for instance sheave 14, is carried on an axle which extends through holes 33 at the front end of the stand, the hauling line 10 being then trained over such sheave and connected with the scoop for pulling it along the boom.

The operation is as follows. The scoop is drawn through the material by the hauling line 10, the depth of engagement being regulated by means of hoisting line 11 (which elevates or lowers the boom as desired), and the cable 24 is pulled by the ditcher stick, compressing spring 22. The scoop is held in the desired position by pressure on the hauling line (or by braking its drum to hold it) and is elevated by raising the boom, and then is swung laterally, by means of line 21, for discharge of the spoil. Discharge may be effected through the bottom by release of the latch (Fig. 1). When discharging through the bottom, the scoop is positioned by a pull on the hauling line opposing the pull of the spring on cable 24. On discharge may be effected through the mouth of the scoop, by inversion of the scoop, the hauling line being released and the stick being allowed to swing out under the expansion of the spring until the scoop is presented downwardly, i. e., with its teeth pointing toward the ground, Fig. 2. In case bottom discharge is employed, closure of the bottom is effected by momentum, generally as described in Patent No. 1,511,114. In this operation, the spring 22 causes the desired rapid preliminary outward swing of the scoop, and the hauling line sharply checks the motion of the scoop, or even momentarily reverses it, causing the bottom to swing shut and be automatically latched. The scoop is then swung about and lowered, in the out-reaching position, for the digging stroke.

In digging hard materials, a sharp blow may be struck by the scoop when in out-reaching position, the hauling line being sharply pulled during the descent of the scoop to accelerate the movement and add force to the blow. See Fig. 2, in which the hauling line is shown taut in full lines, and slack in dotted lines. When the scoop reaches its outermost position, as shown, and the hauling line is pulled, said line momentarily moves up into the groove in head 31; hence, the hauling line is momentarily guided and interference with the boom and pivot 7 is obviated.

Rooting (digging with a force concentrated alternately on the side rake teeth 34 and the bottom teeth 35) may be accomplished by executing one or more strokes with the bottom unlatched and only the side rake teeth engaging, then latching the bottom and digging primarily with the bottom teeth.

An advantage of the invention is the fact that there is no position of equilibrium for the scoop, that is, the position in which the boom weight and the ditcher stick weight balance each other, with the hauling line slack so that the scoop remains in such position. With the machine of Patent No. 1,511,114, there is an extended position beyond which the scoop will not travel, with a normal weight of the boom, and with a given boom elevation. The only way a ditcher stick may be brought substantially into alinement with the boom is to lower the boom until it is substantially parallel to level ground. According to the present invention, the stick may reach out until it swings above the longitudinal axis of the boom, as shown in Fig. 2, even though the boom is elevated. This position is not attained by the machine of said patent, because the only ways to get the stick out so far are to lengthen the arm of the ditcher stick which extends above the boom pivot, or else to considerably increase the weight of the boom. Both changes necessarily involve a waste of power, and hence are not resorted to. The machine of this invention has no fixed equilibrium position of the scoop and stick for a given elevation of the boom, and hence its scoop is capable of assuming many positions not assumed by the earlier machine. This may be of decided practical advantage, as for instance in trenching up hill or on an incline, the scoop may be presented with its teeth substantially at right angles to the surface to be broken through, thereby delivering the most effective blow. Any properly designed machine having a position of equilibrium would not be able to turn the scoop to present its teeth straight down to an upwardly inclined surface, because the elevation of the boom necessary to clear the ground surface would lower the scoop, so that its teeth could strike only a glancing blow, from a low elevation.

The invention makes such provision for retraction of a ditcher stick that the boom and stick pivot may be held stationary during the swinging movement of the stick. This makes easier an accurate calculating by the operator of the scoop movements, both in the digging and discharge phases of operation. In a machine of the type of Patent 1,511,114, an operator does not become familiar with the movements of the scoop resulting from manipulation of the two lines for quite a long time, because the weight of the boom, and the relationship of this weight to the weight of the scoop (loaded or unloaded) materially alter the movements of scoop.

The invention also obviates interference of the head of the stick, or apparatus attached thereto, with that portion of the boom immediately in rear of the point of attachment to the stick. Such interference would be objectionable because it would limit the angular movement of the stick with reference to the boom.

The invention also provides means for varying from time to time the stick-retracting effort, so that the nature of the work and the varying weights of the scoops are provided for.

The invention further provides a hoisting line attachment for ditchers which is not disturbed in the interchange of ditcher and skimmer scoops, thus facilitating crane work incident to the interchange.

While the description has been directed to a dividing scoop only, that is, a scoop having a hinged wall for discharge, the invention is applicable to a machine employing a fixed scoop or an oscillating scoop, an example of the latter being found in Patent No. 1,476,121.

Although a compression spring is the preferred means for effecting an out-thrust of the ditcher stick, a tension spring could be used. Instead of a spring, another form of automatic motor or means for storing energy might be employed, but operating difficulties with other mechanisms the mechanical equivalents of springs will doubtless dictate the employment of springs exclusively. Of course, more than one spring might be used.

The spring or the like may be carried on the boom, as shown, or on the stick, or on the machine, provided suitable connections are made to effect an out-thrust of the stick by the spring upon release of the hauling line.

Adjustment of initial tension of the spring may be provided for at either end of the cable 24. The outer end is more accessible and hence is preferred.

Obviously, the present invention is not restricted to the particular embodiment thereof herein shown and described. Moreover, it is not indispensable that all the features of the invention be used conjointly, since they may be employed advantageously in various combinations and sub-combinations.

What I claim is:—

1. An excavating machine comprising, in combination, a boom pivoted to swing both vertically and horizontally; a ditcher stick pivoted at its upper end to the outer end of the boom; a scoop on the lower end of the ditcher stick; a hauling line attached to the scoop for moving the stick and scoop inwardly toward the boom; a hoisting line supporting the boom but being free of any connection with the ditcher stick; a spring on the boom; and means connecting the spring to the ditcher stick so that the ditcher stick is swung outwardly beyond the plumb by said spring as the hauling line is released to permit such swing.

2. In combination with the boom and ditcher stick assembly of a ditching machine, mechanism for swinging the stick out beyond the plumb, comprising a compression spring; a casing housing said spring; a piston acted on by said spring; a cable connected to the piston and passing through the spring outside the casing and being secured to the ditcher stick; and means for guiding the cable as the ditcher stick assumes various angular positions relative to the boom.

3. In combination with the boom and ditcher stick assembly of a ditching machine, mechanism for swinging the stick out beyond the plumb, comprising a compression spring; a casing housing said spring; a piston acted on by said spring; a cable connected to the piston and passing through the spring outside the casing and being secured to the ditcher stick; a pair of sheaves, adjacent the end of the casing, between which the cable passes; and means fixed on the upper end of the ditcher stick for guiding the cable between said sheaves and its point of attachment to the ditcher stick.

4. In combination with the boom and ditcher stick assembly of a ditching mechanism, mechanism for swinging the stick out beyond the plumb, comprising a compression spring; a casing housing said spring; a piston acted on by said spring; a cable connected to the piston and passing through the spring outside the casing and being secured to the ditcher stick; an adjustment member connecting the cable to the ditcher stick so that the tension of the spring may be adjusted by movement of the adjustment member.

5. In combination with the boom and ditcher stick assembly of a ditching machine, mechanism for swinging the stick out beyond the plumb, comprising a compression spring; a casing housing said spring; a piston acted on by said spring; a cable connected to the piston and passing through the spring outside the casing and being secured to the ditcher stick; an adjustment member connecting the cable to the ditcher stick so that the tension of the spring may be adjusted by movement of the adjustment member; and means for guiding the cable as the ditcher stick assumes various positions relative to the boom, said means including a pair of sheaves fixed on the boom, and a grooved head fixed on the upper end of the ditcher stick; the groove in the head receiving said cable, which also passes between said sheaves.

6. An excavating machine comprising, in combination, a pivoted boom; a ditcher stick pivoted at its upper end to the outer end of the boom; a hauling line connected with the ditcher stick; a hoisting line supporting the boom but being free of any connection with the ditcher stick; a spring; and means connecting the spring to the boom and ditcher stick so that the energy of the spring is available to throw the ditcher stick outwardly beyond the plumb when the hauling line is released or paid out.

7. An excavating machine comprising, in combination, a pivoted boom; a ditcher stick pivoted at its upper end on the outer end of the boom; a grooved head on the upper end of the ditcher stick having an arcuate form and positioned eccentrically relative to the stick pivot; a cable passing over the grooved head and lying in the groove thereof and attached at one end to the ditcher stick; spring-actuated means for exerting a pull on the other end of the cable, thereby to throw the ditcher stick outwardly beyond the plumb; the eccentric positioning of the groove head giving the cable a constantly increasing moment arm with which to pull the stick outwardly, as the stick moves toward the outwardly extended position.

8. An excavating machine comprising, in combination, a pivoted boom; a ditcher stick pivoted at its upper end on the outer end of the boom; a hauling line connected with the ditcher stick; a hoisting line supporting the boom but being free from a connection with the ditcher stick; a grooved head on the upper end of the ditcher stick having an arcuate form and positioned eccentrically relative to the stick pivot; a cable passing over the grooved head and lying in the groove thereof and attached at one end to the ditcher stick; spring-actuated means for exerting a pull on the other end of the cable, thereby to throw the ditcher stick outwardly beyond the plumb; the eccentric positioning of the grooved head giving the cable a constantly increasing moment arm with which to pull the stick outwardly, as the stick moves toward the outwardly extended position.

In testimony, that I claim the foregoing as my own, I have hereto affixed my signature.

ROBERT REX DOWNIE.